Oct. 3, 1967  R. E. KELLER  3,344,747
ADJUSTABLE MOUNTING AND SUPPORT FOR THE FLANGED WHEELS
OF A CONVERTIBLE RAIL-HIGHWAY VEHICLE
Filed Sept. 20, 1965  3 Sheets-Sheet 1
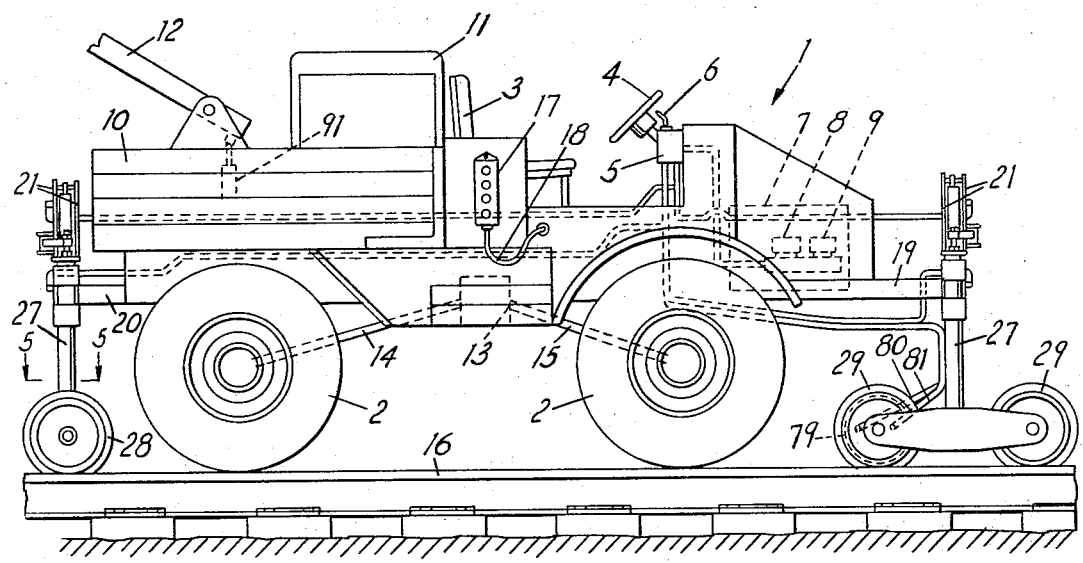
Fig. 1.
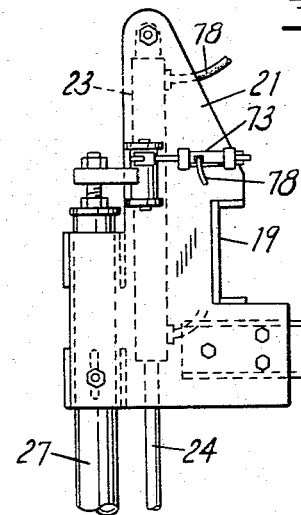
Fig. 2.
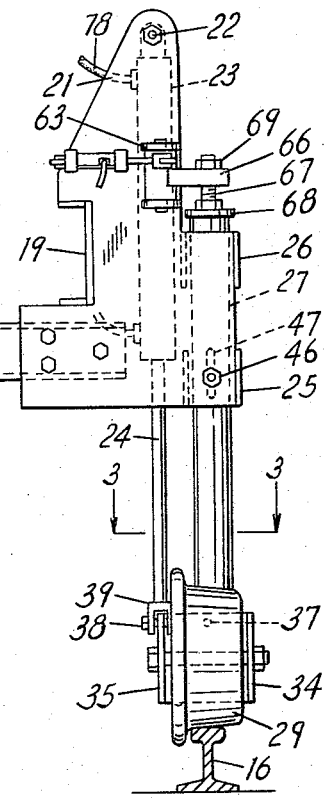
INVENTOR.
Ralph E. Keller
BY Austin A. Webb
ATTORNEY

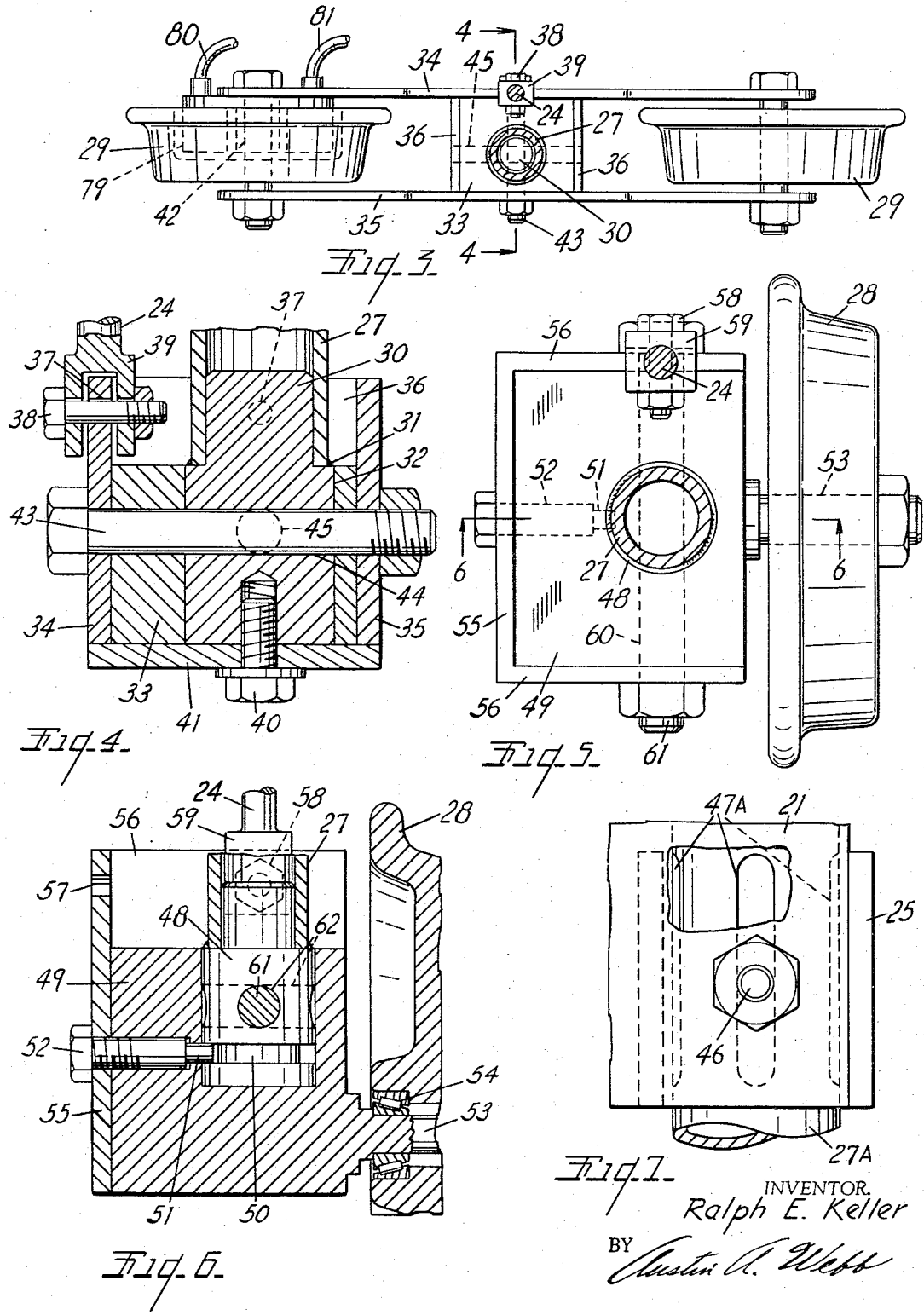

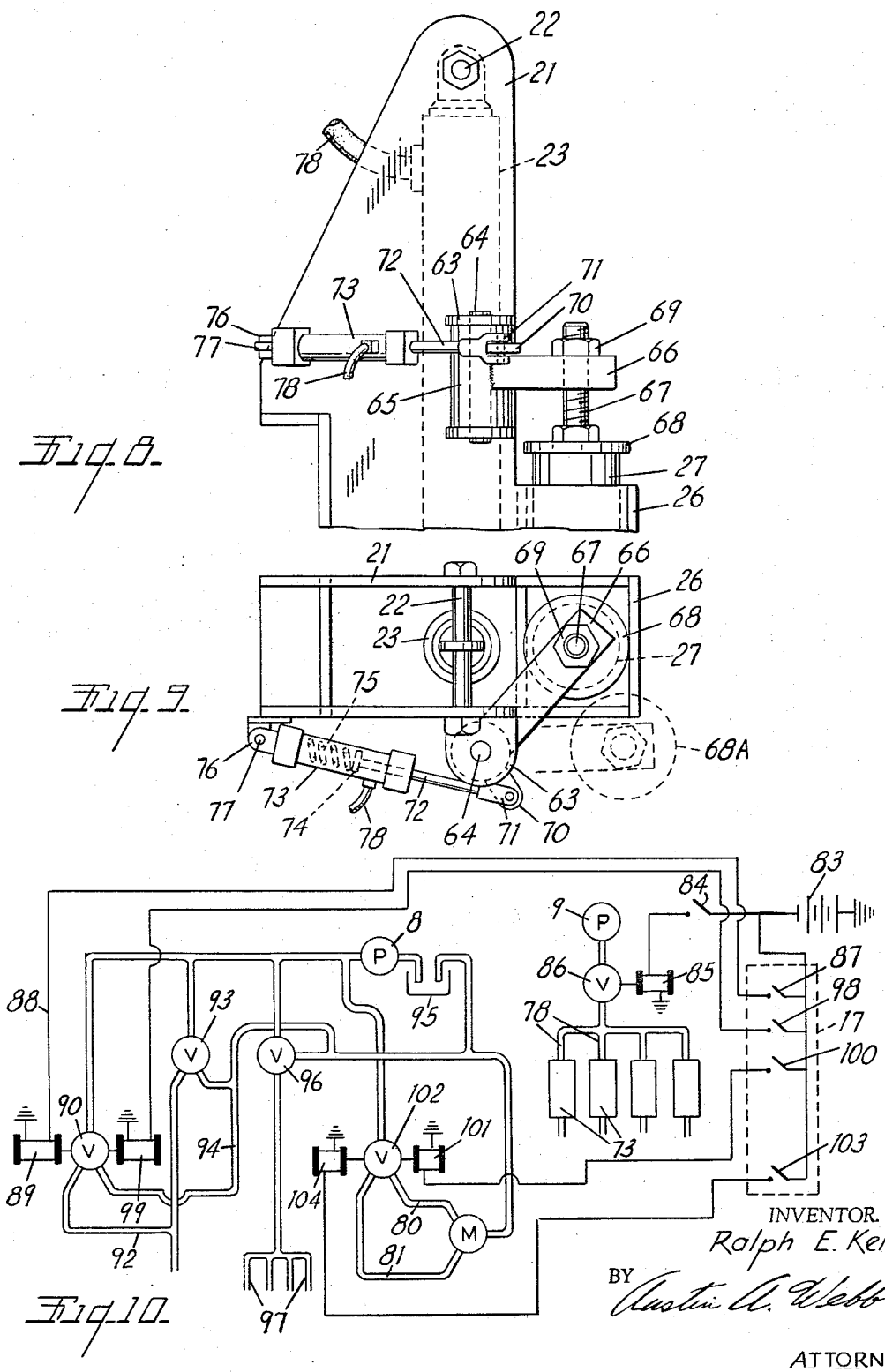

United States Patent Office 3,344,747
Patented Oct. 3, 1967

3,344,747
ADJUSTABLE MOUNTING AND SUPPORT FOR THE FLANGED WHEELS OF A CONVERTIBLE RAIL-HIGHWAY VEHICLE
Ralph E. Keller, Kalamazoo, Mich., assignor to Kalamazoo Manufacturing Company, Kalamazoo, Mich.
Filed Sept. 20, 1965, Ser. No. 488,689
11 Claims. (Cl. 105—215)

ABSTRACT OF THE DISCLOSURE

Mounting brackets connected to the frame of a rubber tired vehicle and forming vertical slideways having lateral locating and supporting engagement with supporting posts for flanged, rail engaging wheels; the rail engaging wheels are manually swingable through 90° about the axes of the supporting posts and selectively secured in either adjusted position; fluid pressure operated cylinders arranged in upright position are selectively connectable to the wheel mountings on the posts in their adjusted positions to force the rail wheels down to rail engaging positions and raise the vehicle; vertically adjustable stops pivotally mounted on the mounting brackets are spring biased to vehicle supporting positions over the end of the wheel supporting posts; remotely controlled, fluid pressure operated controls are connected to the stops to permit the posts and flanged wheels to rise relative to the vehicle. Alternative single and dual tandem wheel mounts, and alternative angular adjustment of the wheel mounts on the posts, or of the posts on the brackets are included; along with means for driving the flanged wheels, and for remotely controlling the post depressing cylinders, the post stops and the wheel driving means.

This invention relates to improvements in adjustable mounting and support for rail engaging wheels of a convertible road to rail vehicle.

The principal objects of this invention are:

First, to provide a rail wheel mounting attachable to a rubber tired vehicle to rigidly support the rail engaging wheels in vehicle supporting relation below the level of the rubber tires and selectively permit the position of the rail wheels in parallel relation to the rubber tires or in angularly adjusted positions relative thereto.

Second, to provide an adjustable rail wheel support for a rubber tired vehicle in which the rail wheels are forced downwardly into vehicle supporting position by a fluid pressure actuated element and are thereafter held in lowered position by a positive locating abutment swingable into and out of supporting relation with the part which carries the rail wheels.

Third, to provide a rail wheel supporting abutment which is swingable between operative and inoperative positions by means of a fluid pressure activated device which can be remotely operated.

Fourth, to provide a rail wheel attachment for a rubber tired vehicle which will permit the attachment of single rail engaging wheels or tandem rail engaging wheels to the vehicle in a manner which will permit the rail wheels to be locked in downwardly extended positions either parallel to the rubber tired wheels or at 90° rotated position therefrom for permitting the vehicle to be moved bodily transversely off of a railway track on temporary set-off rails and in which the rail engaging wheels will be rigidly locked in either adjusted position to effectively control and direct the movement of the vehicle along the rails.

Fifth, to provide an adjustable rail wheel mounting having the properties described above which is relatively simple and inexpensive to manufacture in sufficiently rugged and rigid form to withstand substantial vehicle guiding forces applied through the wheels to the vehicle in operation.

Other objects and advantages of the invention will be apparent from a consideration of the following description and claims. The drawings of which there are two sheets illustrate a highly practical form of the rail wheel mounting of the invention and two alternative forms of angularly adjusted locking structure for the wheels.

FIG. 1 is a fragmentary side elevational view of a rubber tired roadway vehicle having single wheel engaging and guiding wheels mounted at the rear corners thereof and double tandem rail engaging wheels mounted at the forward corners thereof.

FIG. 2 is a fragmentary front elevational view of the rail wheel mounting structure shown in FIG. 1.

FIG. 3 is a horizontal cross sectional view taken along the plane of the line 3—3 in FIG. 2.

FIG. 4 is a fragmentary vertical cross sectional view taken along the plane of the line 4—4 in FIG. 3.

FIG. 5 is a horizontal cross sectional view through the single wheel mounting taken along the plane of the line 5—5 in FIG. 1.

FIG. 6 is a fragmentary vertical cross sectional view taken along the plane of the line 6—6 in FIG. 5.

FIG. 7 is a fragmentary front elevational view of a modified form of angular adjusting and securing structure for the rail wheels.

FIG. 8 is an enlarged fragmentary front elevational view of the supporting abutment for the rail wheel mounting structure.

FIGURE 9 is a fragmentary top plan view of the rail wheel supporting abutment shown in FIG. 8.

FIG. 10 is a schematic view of the hydraulic and electrical circuits of the vehicle shown in FIG. 8.

FIGURE 1 illustrates a motor vehicle particularly adapted for work on railroad road beds or in conjunction with other railway activities but capable of moving rapidly and easily on roadways or over the ground to arrive at its work position. The vehicle includes a body generally indicated at 1 mounted on four rubber tired wheels 2 for operation on flat surfaces. An operator's seat is indicated at 3 behind a steering wheel 4 for steering the road wheels and adjacent a control panel or box 5 having controls, one of which is indicated at 6 for operating various parts and accessories of the vehicle. The driving motor or engine for the vehicle is indicated at 7 and is connected by suitable well known drive connections for operating a hydraulic pump 8 and an air compressor 9. The rear truck body 10 of the vehicle carries a separate unit 11 for operating power operated tools or implements on the truck such as the crane boom 12 or portable hand tools, not illustrated, for use on roadbed around the vehicle.

The motor or engine 7 is connected through a transmission 13 and drive shafts 14 and 15 to the road wheels 2 and the road wheels have a tread spacing such as to rest upon the rails 16 of a railway when desired. Portably connected to the side of the body of the vehicle is a remote control unit 17 having control bottoms or switches connecting through a flexible cable 18 for permitting operation of various elements or parts of the vehicle and its power driven tools as will be described in greater detail presently.

The frame of the vehicle has forwardly extending side members 19 and rearwardly extending side members 20 to which the rail wheel supporting structure of the invention is attached. With particular reference to FIGS. 2, 8 and 9 it will be noted that the rail wheel supporting structure consists of front to rear spaced frame elements or plates 21 which are notched on their inner sides to be rigidly connected to the frame extensions 19 and 20. The frame elements are the same so that the description of one will suffice. At their upper ends the frame elements carry a cross pin or bolt 22 to which is connected the upper end of a hydraulic cylinder 23. The cylinder extends downwardly between the plates or frame elements and has a downwardly extensible piston rod 24 connectable to the rail wheels as will be described. Transversely outwardly from the cylinder 23 the plate and frame elements 21 are connected by cross straps or pieces 25 and 26 forming vertically spaced and aligned guide or slideways for a rail wheel supporting post 27 which in the example illustrated is a cylindrical tube. As previously noted the rear posts or tubes 27 carry a single rail engaging wheel 28 while the forwrd posts carry a pair of tandem wheels 29. The particular arrangement of the single and tandem wheels at the front and rear of the vehicle is unimportant and either may be substituted for the other.

Considering the first the tandem wheel mounting, the tube or post 27 is provided at its lower end with a plug 30 secured by welding at 31 (see FIG. 4) and provided with a depending cylindrical bearing surface 32. The bearing 32 receives and rotatably supports a wheel supporting block 33 that has an inner wheel mounting plate 34 secured to its inner side and an outer wheel supporting plate 35 secured to its outer side. Extending between the wheel supporting plates 34 and 35 and along opposite sides of the block 33 are cross plates 36 which are spaced from the axis of the post 27 equivalent to the distance of the inner plate 34 from the same axis. At least the inner plate 34 and cross plates 36 project above the block 37 and define connections in the form of holes 37 for selectively receiving the pin or bolt 38 on a yoke 39 connected to the lower end of the piston rod 24 of the hydraulic cylinder associated with the wheel supporting frame element. The block 33 and plates 34 and 35 are vertically secured to the post 27 by a screw 40 engaged upwardly through a bottom plate 41 into the bottom of the plug 30.

The wheel supporting plates 34 and 35 support the tandem wheels 29 by suitable axles 42 connected between the ends of the plates. With the foregoing structure it is possible and practical with the weight of the vehicle resting entirely upon the rubber tired wheels 2 to disconnect the yoke 39 by removing the bolt 38 and to remove a cross bolt 43 which extends transversely through the side plates and block 33 and one cross bore 44 in the block so that the entire block 33, side plates 34 and 35 and the wheel carried thereby can be rotated 90° from the position illustrated after which the bolt 43 is reinserted through a second bore 45 formed at right angles through the plug 37. The wheel support is then positioned so as to engage temporary transverse set off rails, not illustrated, for moving the vehicle off of the rails 16 should the vehicle be in a location along a railroad right of way where it cannot be conveniently or safely driven directly off of the rails on its rubber tired wheels 2. The post 27 is held against rotation in the slide-way forming elements 25 and 26 by a bolt 46 passed through the slideway and a slot 47 in the post which permits vertical movement of the post and the wheel mounting under the influence of the piston rod 24 as will be described.

The single wheel mounting and its angular adjustment is shown in FIGS. 5 and 6 in which the post 27 projects downwardly to a cylindrical bearing 48 at its lower end on which the wheel mounting block 49 is rotatably mounted. An annular groove 50 in the bearing receives the end 51 of a retaining screw 52 which supports the block on the post. The block has an integral wheel spindle 53 projecting from one side thereof on which the rail wheel 28 is mounted by means of suitable bearings 54. The block 49 carries an inner side plate 55 and front and rear plates 56 which projects above the block and define holes 57 for receiving the removable connecting bolts 58 through the yoke 59 on the lower end of the extensible piston rod 24 associated with the post 27. The block 49 and plates 56 define a horizontal bore 60 through which the angular adjusting pin or bolt 61 is passed. The pin 61 passes selectively through bores 62 arranged at right angles through the bearing 48 and by removing the bolt or pin 61 and the yoke connecting pin 58 the block 49 and the wheel 28 carried thereby can be rotated 90° and clamped in adjusted position parallel to the front wheels 29. In either adjusted position the wheels are held rigidly against angular turning or lateral tilting for effectively retaining the vehicle and its rubber tires 2 on the rails 16.

FIG. 7 illustrates a modified structure for angularly adjusting the position of the rail wheels 28 and 29. The lower slideway forming portion 25 of the frame element carries the same bolt or pin 46 which passes through a modified post 27A. Instead of a single vertical slot as in the first form of the post, the post is provided with guide slots 47A at 90° rotated positions so that by removal of the bolt 46 and the yoke connecting bolt 38 or 58 between the wheel mounting and the piston rod 24 the wheel supporting post 27A can be rotated 90° carrying the entire wheel mount at the lower end of the post with the post. When the modified adjustable mounting of the post 27A is used it is of course unnecessary to provide the rotatable bearing blocks 33 and 49 at the lower ends of the posts but the block must still be provided with connections corresponding to the holes 37 and 57 at 90° rotative positions for connection to the yoke on the piston rod 24.

The mechanism for forcing the posts 27 downwardly to engage the rail wheels with the rail and support part of the weight of the vehicle is more clearly shown in FIGS. 8 and 9. The spaced plates or frame elements 21 have horizontal ears 63 projecting from the outer side of the frame elements, that is away from the ends of the vehicle and these ears support a pivot pin 64 around which the sleeve 65 is pivotally mounted. The sleeve 65 supports a radially projecting arm 66 with a threaded hole in its swinging end receiving the threaded stem 67 of an abutment plate or disc 68. The arm 66 and abutment 68 are swingable, as shown in FIG. 9, between the full line position located over the upper end of the post 27 and a laterally displaced dotted position 68A in which the post is free to slide in the slideway elements 25 and 26. A clamp or lock nut 69 on the stem 67 permits securing the abutment 68 in vertically adjusted positions on the frame elements to determine the extent to which the frame elements and the body of the vehicle to which they are connected may descend along the post 27.

The sleeve 65 has a projecting ear 70 to which a yoke 71 on the end of a pivot rod 72 is connected. The pivot rod 72 reciprocates in a fluid or air pressure operated cylinder 73 with the piston 74 on the piston rod biased to extended position by a coil spring 75 within the cylinder. The end of the cylinder has a yoke 76 pivotally connected to the frame element at 77. A conduit 78 for admitting air into the cylinder to retract the piston rod 72 is connectable as will be described to a source of pressure such as the compressor 9.

From the foregoing it will be apparent that the wheel supporting posts or slides 27 and the rail wheels mounted thereon can be forced downwardly into engagement with the rails by the admission of hydraulic pressure to the cylinders 23. This results in relative upward motion of the frame elements 21 and the vehicle body until the abutment discs 68 swing under spring tension to the full line position illustrated in FIG. 9. At this time the intentional or accidental failure of hydraulic pressure to any of the cylinders 23 cannot permit collapse of the wheel mount supports so the rail wheels are securely and safely engaged in guiding relation with the rails. The pressure of the weight of the vehicle acting through the abutment discs 68 on the upper ends of the posts 27 together with the spring biasing pressure on the piston 74 prevents disengagement of the abutment plates from the upper ends of the posts. When it is desired to release the rail wheels from the rails and transfer the entire support for the vehicle to the rubber tired wheels 2 hydraulic pressure is again admitted to the cylinders 23 to depress the wheel mounts and the posts relative to the frame elements at which time the abutment discs 68 are free of the posts and with admission of air pressure by the conduits 78 to the cylinders 73 swings the arms 66 and the abutments 68 out of the path of the posts and the hydraulic pressure in the cylinders 23 can be released lowering the frame elements and the body of the vehicle onto the rubber tired wheels 2. The hydraulic cylinder 23 may be double acting to lift the weight of the road wheels and the posts 27 well above the ground on which the rubber tired wheels are supported. Once the upper ends of the posts 27 pass the abutments 68, air pressure to the cylinders 73 can be released as the spring 75 will merely bias the abutments against the sides of the raised posts.

One or more of the rail wheels 29, for example the rear tandem wheel in FIG. 3, may be provided with a hydraulic motor 79 with hydraulic supply conduits 80 and 81 for reversely driving the wheel so that the vehicle may be moved along the rails without driving the rubber tired wheel 22. This is advantageous when performing work at shortly spaced intervals along the rails and the portable control 17 removably mounted on the side of the vehicle permits this operation to be performed without anyone in the operator's seat by an attendant standing alongside of the machine or vehicle where he can closely observe the work being performed and the desired position of the vehicle.

FIG. 10 is a schematic wiring and piping diagram of one possible set of controls for effective use of the vehicle as a railway roadbed repair vehicle. A source of current in the battery 83 of the vehicle is connectable through a switch 84 to activate the solenoid coil 85 of a valve 86 for admitting air pressure from the pump 9 to the several conduits 78 and cylinders 73 for retracting the abutments from the wheel supporting posts. This would normally be performed from the operator's position in the vehicle preparatory to moving the vehicle off of the rails. The battery 83 is also connectable through with switch 87 in the remote control unit through the conductor 88 to a solenoid coil 89 for moving the two position valve 90 to admit hydraulic pressure from the pump 8 to a work element on the vehicle such as the boom operating cylinder 91, see FIG. 1. The fluid pressure is supplied to the cylinder through a conduit 92 and a parallel control valve 93 may be provided for operation from the operator's position. Return fluid from the piston 91 is directed through the return conduit 94 from both valves to the sump 95 of the pump. A manually operable valve 96 also normally positioned adjacent the operator's position is effective to supply hydraulic pressure from the pump to the four conduits 97 extending to the hydraulic cylinders 23 for forcing the wheel mounting and the posts downwardly when the vehicle is to be engaged with the rails 16.

A rear motion control switch 98 in the remote control 17 activates the solenoid coil 99 for reversely actuating the valve 90 and reversing the motion of the boom or work element 12. A forward control switch 100 energizes the solenoid coil 101 for moving the valve 102 to admit fluid pressure from the pump to one conduit 80 for driving the hydraulic motor 79 forwardly while a reverse control switch 103 energizes a solenoid coil 104 for actuating the valve 102 to admit hydraulic pressure to the other conduit 81 for reversely driving the hydraulic motor. Variations in the control circuit and system may obviously be made depending upon the work to be done and the parts to be controlled. Regardless of the equipment carried by the vehicle and the arrangement of the controls thereof, the vehicle is effectively and safely guided on the rails when desired and is easily removed from the rails and movable along roadway surfaces or set off rails at the occasion demands.

What is claimed as new is:

1. In a roadway to rail conversion assembly for motor vehicles having rubber roadway wheels, a frame element at four rectangularly spaced points on the vehicle defining upright slideways, rail wheel support posts reciprocable in said slideways and laterally rigidly supported thereby, fluid pressure operated cylinders with extensible piston rods carried by said frame elements parallel to said posts, and a rail wheel mounting on the lower end of each of said posts, means for horizontally angularly adjusting said wheel mounting through 90° of rotation, means for rigidly fixing the angularly adjusted position of said wheel mounting, a releasable connection between the extensible part of said cylinder and piston rod and said wheel mounting, said releasable connection being engageable in angularly adjusted positions of said wheel mounting, a support post abutment movably mounted on said frame element and movable thereon between clearing relation and vertically blocking load supporting relation to said post, and remotely operable means connected to swing said abutment out of post engaging position.

2. A roadway to rail conversion assembly (according to 1) in which said means for angularly adjusting said wheel mount included a swivel element rotatably mounted on the lower end of said post, and a pin removably engaged through said post and said swivel element in rotation preventing relation in plural angularly adjusted positions of the post and swivel element, said releasable connection being engagable with said swivel element in corresponding plural adjusted positions of the swivel element.

3. A roadway to rail conversion assembly (according to 2) in which said swivel element consists of a block having plates on its sides in angularly displaced positions and projecting thereabove for engagement in said releasable connection.

4. A roadway to rail conversion assembly (according to 3) in which there are plates on opposite sides of said swivel element extending to the front and rear thereof, and a pair of rail engaging wheels rotatably supported between the ends of said plates in tandem relation to each other and said post.

5. A roadway to rail conversion assembly (according to 3) in which said swivel element has a wheel spindle projecting therefrom with a single rail engaging wheel mounted thereon.

6. A roadway to rail conversion assembly (according to 4) in which said abutment is carried by an arm pivoted on said frame element, said abutment is vertically threadedly adjustable on said arm, and a fluid pressure operated device mounted on said frame element and connected to said arm to swing said arm and said abutment out of post engaging position.

7. A roadway to rail conversion assembly (according to 5) in which said abutment is carried by an arm pivoted on said frame element, said abutment is vertically threadedly adjustable on said arm, and a fluid pressure operated device mounted on said frame element and connected to said arm to swing said arm and said abutment out of post engaging position.

8. A roadway to rail conversion assembly (according to 1) in which said means for angularly adjusting and for rigidly fixing said wheel mounting consists of a removable bolt passed in rotation preventing relation through said slideway and said post, and bolt receiving openings formed through said post in 90° angularly spaced relation, the passages for said bolt in one of said slideway forming element and said post being vertically elongated permitting vertical sliding of the post in each angularly adjusted position thereof.

9. A roadway to rail conversion assembly (according to 1) in which said abutment is mounted on an arm supported by a vertical pivot on said frame element, a vertically adjustable connection between said abutment and said arm, and a fluid pressure operated extensible element connected between said frame element and said arm to swing said arm.

10. A roadway to rail conversion assembly (according to 9) in which said abutment has a screw connection to said arm for vertical adjustment, and said extensible element is spring biased to swing said arm and abutment out of supporting engagement with said post and is movable by fluid pressure into post supporting position of the abutment.

11. A roadway to rail conversion assembly (according to 8) in which said abutment has a screw connection to said arm for vertical adjustment, and said extensible element is spring biased to swing said arm and abutment out of supporting engagement with said post and is movable by fluid pressure into post supporting position of the abutment.

References Cited

UNITED STATES PATENTS

| | | | |
|---|---|---|---|
| 2,915,989 | 12/1959 | Hoppe et al. | 105—215 |
| 3,020,858 | 2/1962 | Perkins et al. | 105—215 |
| 3,130,686 | 4/1964 | Fiechter et al. | 105—215 |

ARTHUR L. LA POINT, *Primary Examiner.*

H. BELTRAN, *Assistant Examiner.*